US 8,543,399 B2

(12) United States Patent
Jeong et al.

(10) Patent No.: US 8,543,399 B2
(45) Date of Patent: Sep. 24, 2013

(54) APPARATUS AND METHOD FOR SPEECH RECOGNITION USING A PLURALITY OF CONFIDENCE SCORE ESTIMATION ALGORITHMS

(75) Inventors: Jae-hoon Jeong, Yongin-si (KR); Sang-bae Jeong, Suwon-si (KR); Jeong-su Kim, Yongin-si (KR); Nam-hoon Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 873 days.

(21) Appl. No.: 11/517,369

(22) Filed: Sep. 8, 2006

(65) Prior Publication Data
US 2007/0136058 A1 Jun. 14, 2007

(30) Foreign Application Priority Data

Dec. 14, 2005 (KR) ........................ 10-2005-0123511

(51) Int. Cl.
*G10L 15/00* (2013.01)
(52) U.S. Cl.
USPC ........... 704/240; 704/231; 704/239; 704/257; 704/256
(58) Field of Classification Search
USPC ................. 395/2, 2.45, 2.65; 704/251, 231, 704/256, 256.7, 257, 239; 381/43
See application file for complete search history.

(56) References Cited

U.S. PATENT DOCUMENTS

| | | | | |
|---|---|---|---|---|
| 4,896,358 A * | 1/1990 | Bahler et al. | .................. | 704/257 |
| 5,218,668 A * | 6/1993 | Higgins et al. | ................. | 704/200 |
| 5,440,662 A * | 8/1995 | Sukkar | ........................... | 704/236 |
| 5,659,662 A * | 8/1997 | Wilcox et al. | ................. | 704/245 |
| 5,710,866 A * | 1/1998 | Alleva et al. | ............... | 704/256.4 |
| 5,953,701 A * | 9/1999 | Neti et al. | ...................... | 704/254 |
| 6,125,345 A * | 9/2000 | Modi et al. | ..................... | 704/240 |
| 7,228,275 B1 * | 6/2007 | Endo et al. | ..................... | 704/235 |
| 7,295,970 B1 * | 11/2007 | Gorin et al. | .................... | 704/221 |
| 2002/0055840 A1 * | 5/2002 | Yamada et al. | ............... | 704/245 |
| 2003/0200086 A1 * | 10/2003 | Kawazoe et al. | ............. | 704/239 |
| 2004/0210437 A1 * | 10/2004 | Baker | ........................... | 704/251 |

FOREIGN PATENT DOCUMENTS

JP 7-56594 3/1995

OTHER PUBLICATIONS

Qin Chao, "Verbal Information Verification for High-performance Speaker Authentication", Jun. 2005, The Chinese University of Hong Kong.*
A.J. Kishnan Thambiratnam, "Acoustic Keyword Spotting in Speech with Applications to Data Mining", Mar. 9, 2005, pp. 1-222.*
BenZeghiba et al., "Hybrid HMWANN and GMM Combination for User-Customized Password Speaker Verification", 2003, IEEE, pp. 225-228.*

\* cited by examiner

*Primary Examiner* — Douglas Godbold
*Assistant Examiner* — Mark Villena
(74) *Attorney, Agent, or Firm* — Staas & Halsey LLP

(57) ABSTRACT

An apparatus for speech recognition includes: a first confidence score calculator calculating a first confidence score using a ratio between a likelihood of a keyword model for feature vectors per frame of a speech signal and a likelihood of a Filler model for the feature vectors; a second confidence score calculator calculating a second confidence score by comparing a Gaussian distribution trace of the keyword model per frame of the speech signal with a Gaussian distribution trace sample of a stored corresponding keyword of the keyword model; and a determination module determining a confidence of a result using the keyword model in accordance with a position determined by the first and second confidence scores on a confidence coordinate system.

18 Claims, 8 Drawing Sheets

FIG. 8
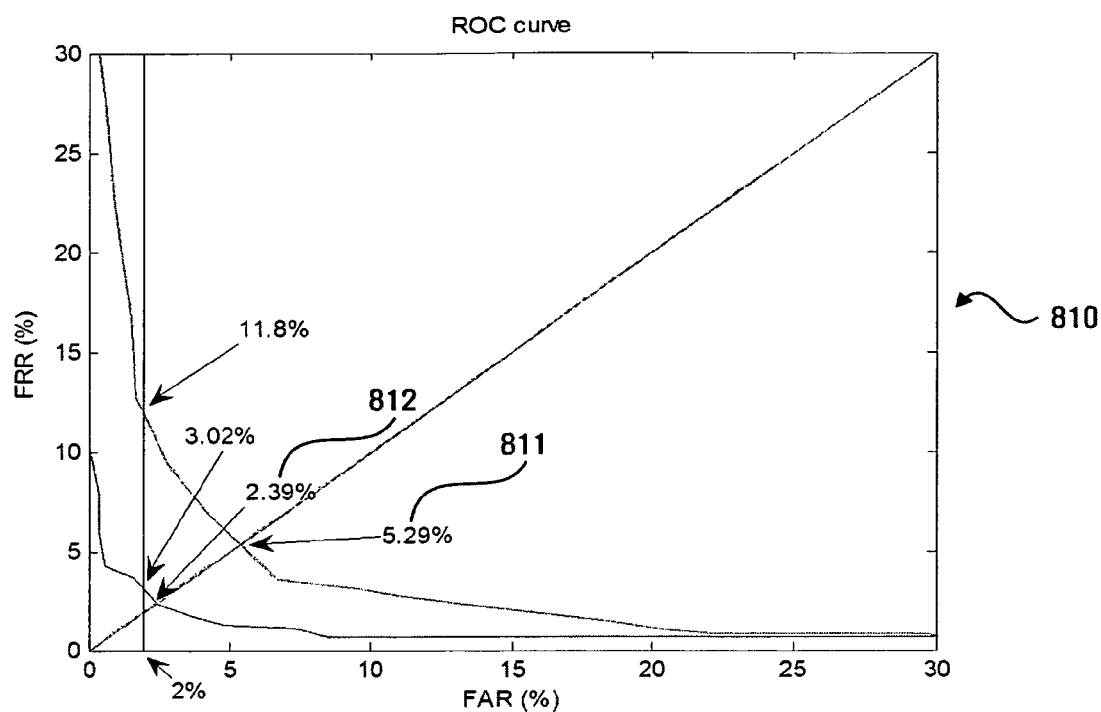
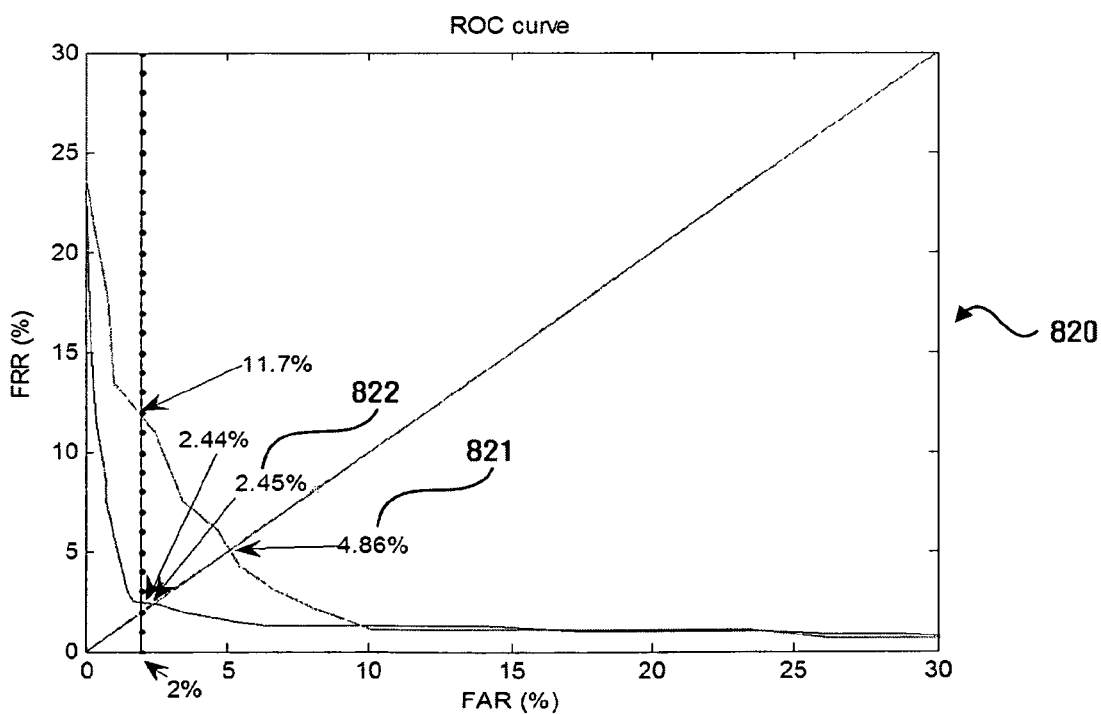

APPARATUS AND METHOD FOR SPEECH RECOGNITION USING A PLURALITY OF CONFIDENCE SCORE ESTIMATION ALGORITHMS

CROSS-REFERENCE TO RELATED APPLICATION

This application is based on and claims priority from Korean Patent Application No. 10-2005-0123511, filed on Dec. 14, 2005 in the Korean Intellectual Property Office, the disclosure of which is incorporated herein by reference.

BACKGROUND OF THE INVENTION

1. Field of the Invention

The present invention relates to an apparatus and method for speech recognition using a plurality of confidence score estimation algorithms and, more particularly, to an apparatus and method for speech recognition using a plurality of confidence score estimation algorithms, in which a score based on a likelihood ratio and a score based on a Gaussian distribution trace are used to set a standard of judgment as to confidence of the result of speech recognition, and an input speech is recognized in accordance with the set standard of judgment to determine the confidence of the result of speech recognition.

2. Description of Related Art

Speech recognition is a series of processes that extracting phonemic and linguistic information from acoustic information included in speech, recognizing the extracted information, and responding to the recognized information. Speech recognition is achieved via speech recognition algorithms. Examples of speech recognition algorithms include a dynamic time warping algorithm, a neural network algorithm, and a hidden Markov model algorithm.

With the recent increase of studies of speech recognition, speech control is being increasingly used in industry. A speech recognition system, which controls electronics at home, such as a home network system and a home automation system, includes a voice user interface (VUI). To effect speech control via such a speech recognition system, it is necessary to detect a keyword required to control electronic home appliances through a natural language in the home environment. And, keyword detection performance increases if confidence estimation of the keyword is accurate.

Human language is not perfectly coincident with a specified format or a specified phoneme. Rather, human language is based on a natural language, and can vary. For this reason, it is important to detect the keyword from recognized speech.

Japanese Patent Unexamined Publication No. 7-056594 discloses a speech recognition system that extracts a multi-dimensional discrete feature vector of input speech using a feature extractor, converts the input speech into a phoneme identification score using the extracted vector, compares a reference pattern of each word to be recognized with a previously stored reference pattern using a dictionary having a stored phonemic label and a dynamic programming technique to obtain a maximum matching score. However, in this speech recognition system a more exact confidence score cannot be obtained because the score fails to reflect variation of a temporal axis of each pattern.

Accordingly, there is a need for a method for calculating confidence score by reflecting variation of a temporal axis of an input speech signal is required.

BRIEF SUMMARY

An aspect of the present invention provides an apparatus and method for speech recognition using a plurality of confidence score estimation algorithms, in which a score based on a likelihood ratio and a score based on a Gaussian distribution trace are used to set a standard of judgment as to confidence score of the result of speech recognition, and an input speech is recognized in accordance with the set standard of judgment to determine the confidence score of the result of speech recognition.

An aspect of the present invention provides an apparatus and method for speech recognition using a plurality of confidence score estimation algorithms, in which a set standard of judgment is variably used by a user.

According to an aspect of the present invention, there is provided an apparatus for speech recognition, the apparatus including: a first confidence score calculator calculating a first confidence score using a ratio between a likelihood of a keyword model for feature vectors per frame of a speech signal and a likelihood of a Filler model for the feature vectors; a second confidence score calculator calculating a second confidence score by comparing a Gaussian distribution trace of the keyword model per frame of the speech signal with a Gaussian distribution trace sample of a stored corresponding keyword of the keyword model; and a determination module determining a confidence of a result using the keyword model in accordance with a position determined by the first and second confidence scores on a confidence coordinate system.

According to an aspect of the present invention, there is provided a method of speech, the method including: calculating a first confidence score using a ratio between a likelihood of a keyword model for feature vectors per frame of a speech signal and a likelihood of a Filler model for the feature vectors; calculating a second confidence score by comparing a Gaussian distribution trace of the keyword model per frame of the speech signal with a Gaussian distribution trace sample of a stored corresponding keyword of the keyword model; and determining a confidence of a result calculated using the keyword model in accordance with a position determined by the first and second confidence scores on a confidence coordinate system.

According to another aspect of the present invention, there is provided a speech recognition method, including: determining a first likelihood using a keyword model that extracted features of an input speech signal match a stored keyword of a keyword model; determining a second likelihood using a filler model that the extracted features of the input speech are noise or do not match the stored keyword; calculating a first confidence score based on a likelihood ratio of the first likelihood and the second likelihood; calculating a second confidence score by comparing a similarity of a Gaussian distribution trace of the keyword model of the input speech signal with a Gaussian distribution trace sample of a stored corresponding keyword; and setting a standard of judgment as to confidence of the result of speech recognition on a coordinate system defined by axes respectively corresponding to the first confidence score and the second confidence score, and determining whether the input speech signal corresponds to a word in a keyword database based on a position determined by the first and second confidence scores on the coordinate system in relation to the standard of judgment.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 8 is a graph illustrating an improved performance according to an embodiment of the present invention.

DETAILED DESCRIPTION OF EMBODIMENTS

Figure 1:
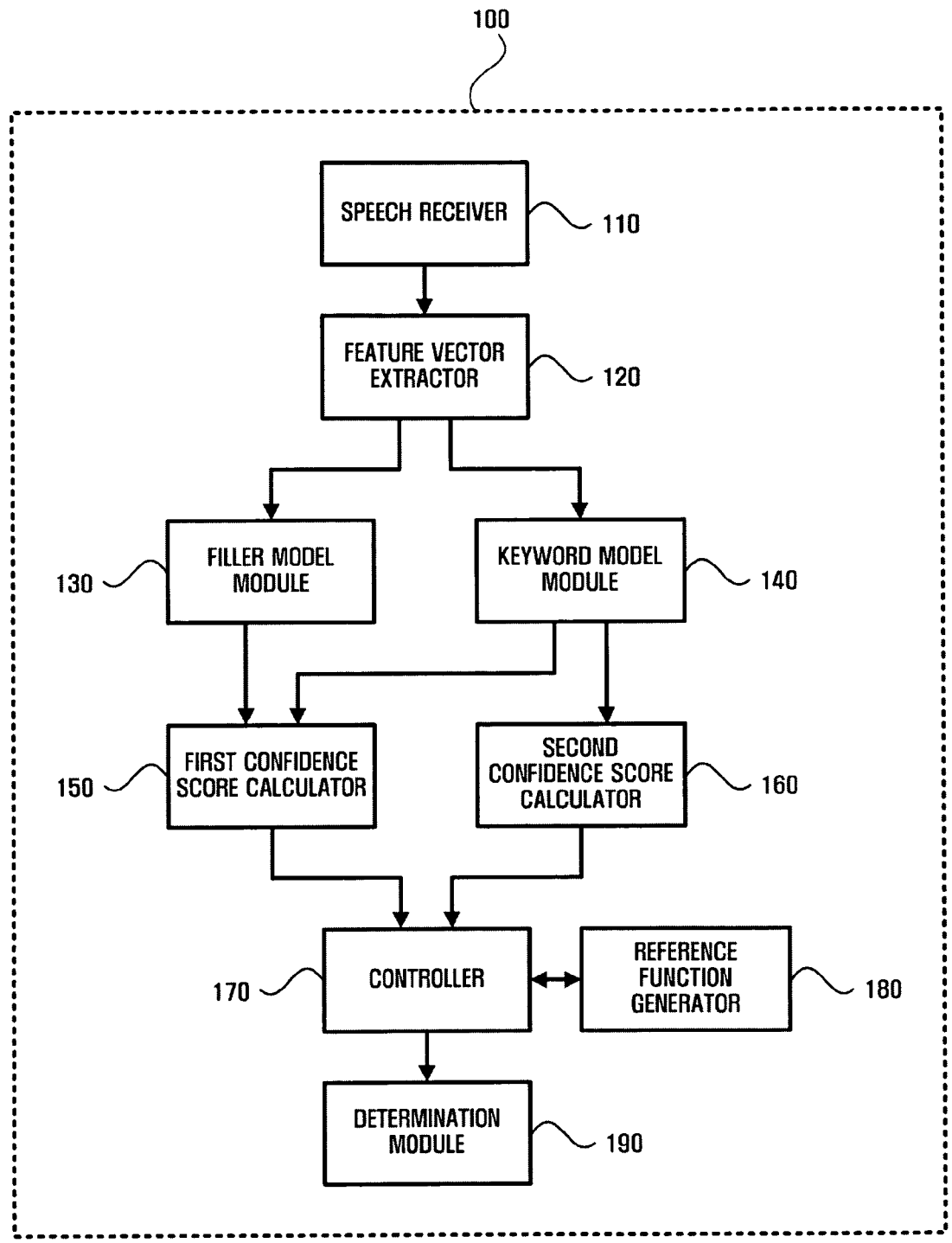
FIG. 1 is a view illustrating the construction of an apparatus for speech recognition using a plurality of confidence score estimation algorithms according to an embodiment of the present invention.

The meanings of various specific terms as they used in the present detailed description follow. It is to be understood, however, that while these terms are being defined, the meanings of these specific terms are not intended to limit the following description.

—Null Hypothesis and Alternative Hypothesis

A null hypothesis is acceptable if there is no reliable counterevidence. By contrast, an alternative hypothesis is acceptable if there is strong evidence that disproves a null hypothesis. A null hypothesis is contrary to an alternative hypothesis. Hereinafter, a null hypothesis is expressed as $H_0$, and an alternative hypothesis is expressed as $H_1$.

—Filler Model

The Filler model is used to search for extraneous acoustics, such as noise or non-keywords, in speech. There exists a method for modeling each sub-part of a non-keyword or modeling the non-keyword in its entirety. A weight value of a likelihood measured for the Filler model is given to identify the Filler model. Whether a word through speech recognition is a keyword can be determined depending on the result of likelihoods from the Filler model and the keyword model.

—Hidden Markov Model

The hidden Markov model is widely used for speech recognition. Supposing that a speech signal is generated by the Markov model, a parameter of a model is assumed in a learning step. Then, a recognition module searches for a model most suitable for unknown input speech by using the assumed parameter. The model used for speech recognition may be a phoneme or a word. The Markov model is a finite state machine (FSM) that changes its state per hour. Hereinafter, the hidden Markov model is referred to as HMM.

—Likelihood

Likelihood represents a probability that a recognized frame, word or sub-word approaches to the keyword model or the Filler model. For example, a probability as to an approximate level that a specified word belongs to the keyword model may be a likelihood of a corresponding keyword model. Also, if the specified word of the keyword model is comprised of sub-words, a likelihood of the keyword model and a likelihood of the Filler model can be obtained after the likelihood for each sub-word is obtained. The sub-word may be subdivided into states or frames to obtain a likelihood depending on the states or the frames, whereby a likelihood of recognized speech can be calculated by the result of the obtained likelihood. In the following described embodiments of the present invention, a likelihood is calculated based on details, such as frames or states, constituting the sub-words. Likewise, in case of the Filler model a, likelihood can be obtained based on frames or states constituting the Filler model.

In the following described embodiments of the present invention, the term "unit", that is, "module" or "table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

FIG. 1 is a view illustrating the construction of an apparatus for speech recognition using a plurality of confidence score estimation algorithms according to an embodiment of the present invention. Referring to FIG. 1, the apparatus 100 for speech recognition (hereinafter, referred to as speech recognition apparatus) includes a speech receiver 110, a feature vector extractor 120, a filler model module 130, a keyword model module 140, a first confidence score calculator 150, a second confidence score calculator 160, a controller 170, a reference function generator 180, and a determination module 190.

The speech recognition apparatus estimates a confidence score of the result of the keyword model for an input speech signal by using a likelihood ratio and a Gaussian distribution trace.

The speech receiver 110 receives the speech signal and converts acoustic energy of the received speech signal into electrical energy. A microphone may function as the speech receiver 110.

The speech receiver 110 converts the speech signal into electrical energy through an arrangement of at least one of an electric resistance variable type that changes electrical resistance using sound pressure, a piezoelectric type that changes a voltage using sound pressure in accordance with a piezoelectric effect, a magnetic variable type that generates a voltage in accordance with vibration of a thin metal foil to change magnetism, a dynamic type based on current occurring in a coil provided around a cylindrical magnet and operated through a vibration plate, and a capacitance type that forms a condenser by facing a vibration plate of a metal foil to a fixed electrode and changes capacitance of the condenser in accordance with motion of the vibration plate due to sound. The converted speech signal is transferred to the feature vector extractor 120.

The feature vector extractor 120 calculates frequency features of the speech signal in units of a frame to extract feature vectors included in the speech signal. That is, the input speech signal is segmented (fragmented) into units (frames). To this end, the feature vector extractor 120 may include an analog-to-digital converter that converts an analog speech signal into a digital audio signal. The converted digital speech signal may, by way of a non-limiting example, be fragmented at an interval of 10 ms.

The feature vector extractor 120 extracts feature vectors of the fragmented speech signal. For example, the feature vector extractor 120 can extract feature vectors of the fragmented speech signal by using at least one of linear predictive coding (LPC), LPC derived cepstrum, perceptive linear prediction (PLP), audio model feature extraction, mel-frequency cepstrum coefficients (MFCC) extraction, and filter bank. The extracted feature vectors are transferred to the Filler model module 130 and the keyword model module 140.

The keyword model module 140 compares an extracted feature vector with a stored keyword to calculate a likelihood that the feature vector of the recognized speech matches the keyword. In this way, the keyword model module calculates how similar (i.e., how close) the extracted feature vector is to the stored keyword. The Filler model module 130 calculates a likelihood that the extracted feature vectors are extraneous acoustic signals (i.e., noise or a non-keyword). The likelihood from the keyword model module 140 is a measure of how likely it is that a portion of the recognized speech is in the keyword model. The likelihood from the Filler model module is a measure of how likely it is that a portion of the recognized speech is not a keyword (i.e, that the input speech is noise or a non-keyword).

The Filler model module 130 can provide a score through various Filler networks. Examples of the Filler networks include a monophone Filler network based on one phoneme, a biphone Filler network that considers relation between a current phoneme to be determined and its previous phoneme or relation between the current phoneme and a following phoneme, and a triphone Filler network that considers both relation between the current phoneme to be determined and its previous phoneme and relation between the current phoneme and its next phoneme.

The first confidence score calculator 150 calculates a first confidence score by using a likelihood ratio between the likelihood from the keyword model module 140 and the likelihood from the Filler model module 130 for the feature vector per frame of the input speech signal.

The likelihood ratio is a ratio between $p(x_k|H_0)$ and $p(x_k|H_1)$. $p(x_k|H_0)$ is the likelihood of the keyword model of the k-th frame feature vector $x_k$ of the recognized speech. $p(x_k|H_1)$ is the likelihood of the Filler model of the k-th frame feature vector $x_k$ of the recognized speech.

The first confidence score is a value that represents whether the input speech signal is similar to the speech signal included in the keyword model. The likelihood ratio between the likelihood of the keyword model and the likelihood of the Filler model may be the first confidence score.

The second confidence score calculator 160 calculates a second confidence score by comparing the Gaussian distribution trace of the keyword model per frame of the input speech signal with the Gaussian distribution trace sample of the stored corresponding keyword of the keyword model.

Meanwhile, the keyword model can be extracted by a Viterbi decoder included in the keyword model module 140.

The calculated first and second confidence scores are transferred to the controller 170. The controller 170 identifies whether the confidence scores are to be used to generate a reference function or to be used to recognize the speech signal. When the confidence scores are to generate the reference function, the controller 170 transfers the confidence scores to the reference function generator 180. When the confidence scores are to recognize the speech signal, the controller 170 transfers the confidence scores to the determination module 190.

Also, the controller 170 controls the operations of the speech receiver 110, the feature vector extractor 120, the Filler model module 130, the keyword model module 140, the first confidence score calculator 150, the second confidence score calculator 160, the reference function generator 180, the determination module 190, and the speech recognition apparatus 100.

The reference function generator 180 generates a boundary serving as a standard of judgment as to whether the input speech signal corresponds to a word in a keyword database in accordance with the position determined by the first and second confidence scores on a predetermined confidence coordinate system.

The confidence coordinate system may be two-dimensional Cartesian coordinate system formed by a first confidence score axis and a second confidence score axis, and can be divided into a keyword area and a non-keyword area based on the boundary generated by the reference function generator 180.

The boundary may be expressed as a function. In this case, a straight line or curved boundary may be formed depending on the function. Alternatively, a linear or non-linear boundary may be formed.

The determination module 190 determines whether the input speech signal corresponds to a word in a keyword database in accordance with the position determined by the first and second confidence scores on the predetermined confidence coordinate system. In other words, if the determined position is included in the keyword area on the confidence coordinate system, the determination module 190 determines that the recognized word is in the keyword database. Conversely, if the determined position is included in the non-keyword area on the confidence coordinate system, the determination module 190 determines that the recognized word is not in the keyword database.

Figure 2:
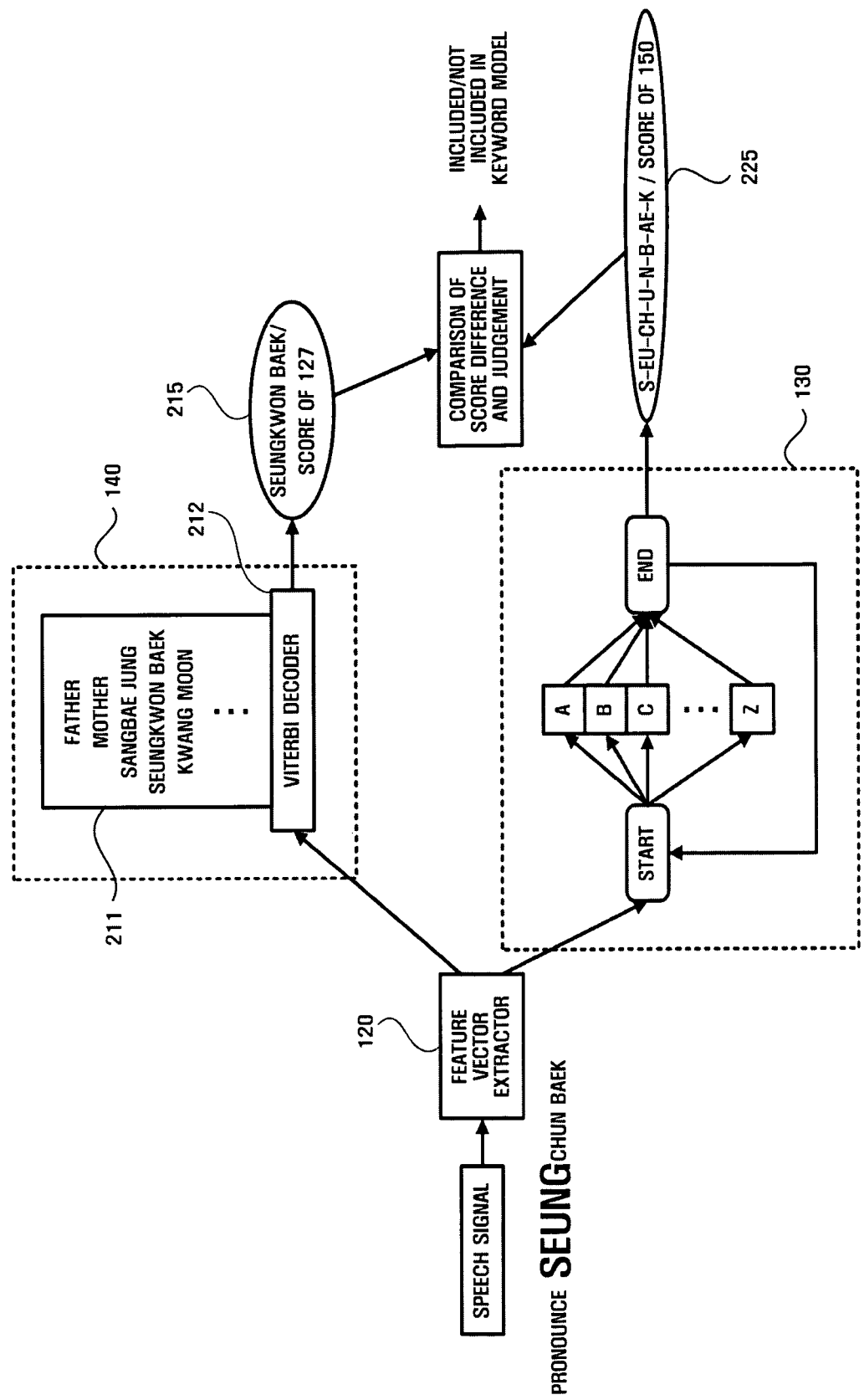
FIG. 2 is an exemplary view illustrating a step of calculating likelihood by recognizing a speech signal through a keyword model module and a filler model module.

FIG. 2 is an exemplary view illustrating an operation of calculating a likelihood by recognizing the speech signal through the keyword model module 140 and the filler model module 130 of FIG. 1.

Referring to FIGS. 1 and 2, if a speech signal called "Seungcheon Baek" is inputted, the feature vector extractor 120 extracts the feature vectors per frame from the speech signal. The extracted feature vectors are provided to the keyword model module 140 and the Filler model module 130.

The keyword model module 140 includes a Viterbi decoder 212 and a keyword database 211. The Viterbi decoder 212 calculates the result obtained by matching the extracted feature with the keyword of the keyword database 211. The Viterbi decoder 212 is widely used for speech recognition, and serves to match the feature vector with the keyword model. As a result 215 of calculation through the Viterbi decoder 212, likelihood having a score of 127 was calculated in the keyword corresponding to "Seungcheon Baek."

Meanwhile, the Filler model module 130 calculates noise or a likelihood of the presence of a non-keyword to filter noise or the non-keyword from the recognized speech. In the present embodiment, the Filler model module 130 recognizes the received speech signal per phoneme. The Filler model module 130 of FIG. 2 repeatedly uses the monophone Filler network until the speech ends. In addition, the Filler model module 130 may use various Filler networks as described above. As a recognition result 225 from the Filler model module 130, a likelihood having a score of 150 was calculated.

The frame may be one state. In this case, the state is a state of the finite state machine like the HMM. The frame and the state may be provided in a one to one relationship. One state may be comprised of a plurality of frames. One frame may represent one state or some of the states.

The results 215 and 225 respectively calculated from the keyword model module 140 and the Filler model module 130 are obtained by adding the whole frames. There may be different methods for speech recognition per frame during the adding operation. Accordingly, it is necessary to convert and add the score per frame before the results are obtained from the keyword model module 140 and the Filler model module 130. The calculating operation per frame and the calculating operation of the first confidence score calculator 150 will be described with reference to FIG. 3.

Figure 3:
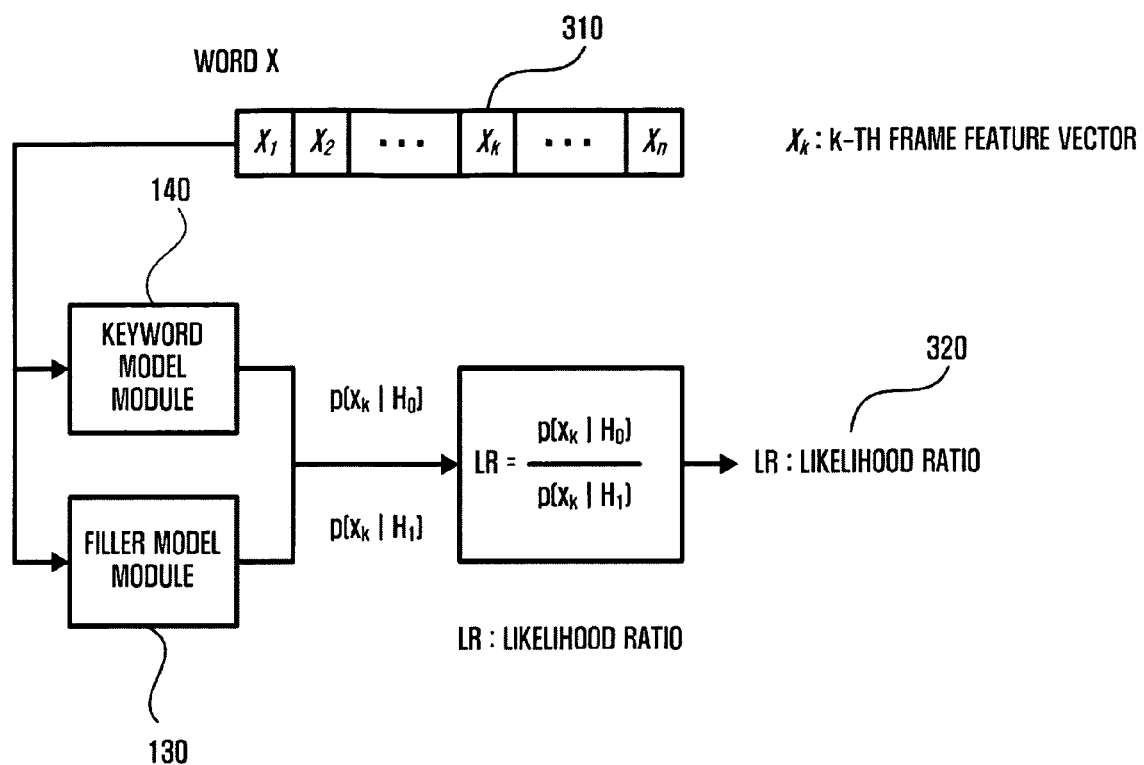
FIG. 3 is an exemplary view illustrating a step of calculating first confidence score for each frame through a first confidence score calculator according to an embodiment of the present invention.

FIG. 3 is an exemplary view illustrating the operation of calculating the first confidence score for each frame, i.e., a likelihood ratio 320 through the first confidence score calculator 150 according to an embodiment of the present invention.

A reference numeral 310 represents feature vectors per frame of the recognized speech, wherein $X_k$ represents the k-th frame feature vector. The likelihood of each of the feature vectors is calculated through the keyword model module 140 and the Filler model module 130.

The likelihood calculated from the keyword model module 140 is $p(x_k|H_0)$, and the likelihood calculated from the Filler model module 130 is $p(x_k|H_1)$. $H_0$ means that exact speech recognition was made and the recognized speech exists in the keyword model. $H_1$ means that the speech is not in the keyword model and corresponds to the Filler model. The likelihood ratio 320 of these two likelihoods correspond to the first confidence score and are transferred to the determination module 190 along with the second confidence score so that they can be used to determine whether the speech signal corresponds to a word included in the keyword database.

Figure 4:
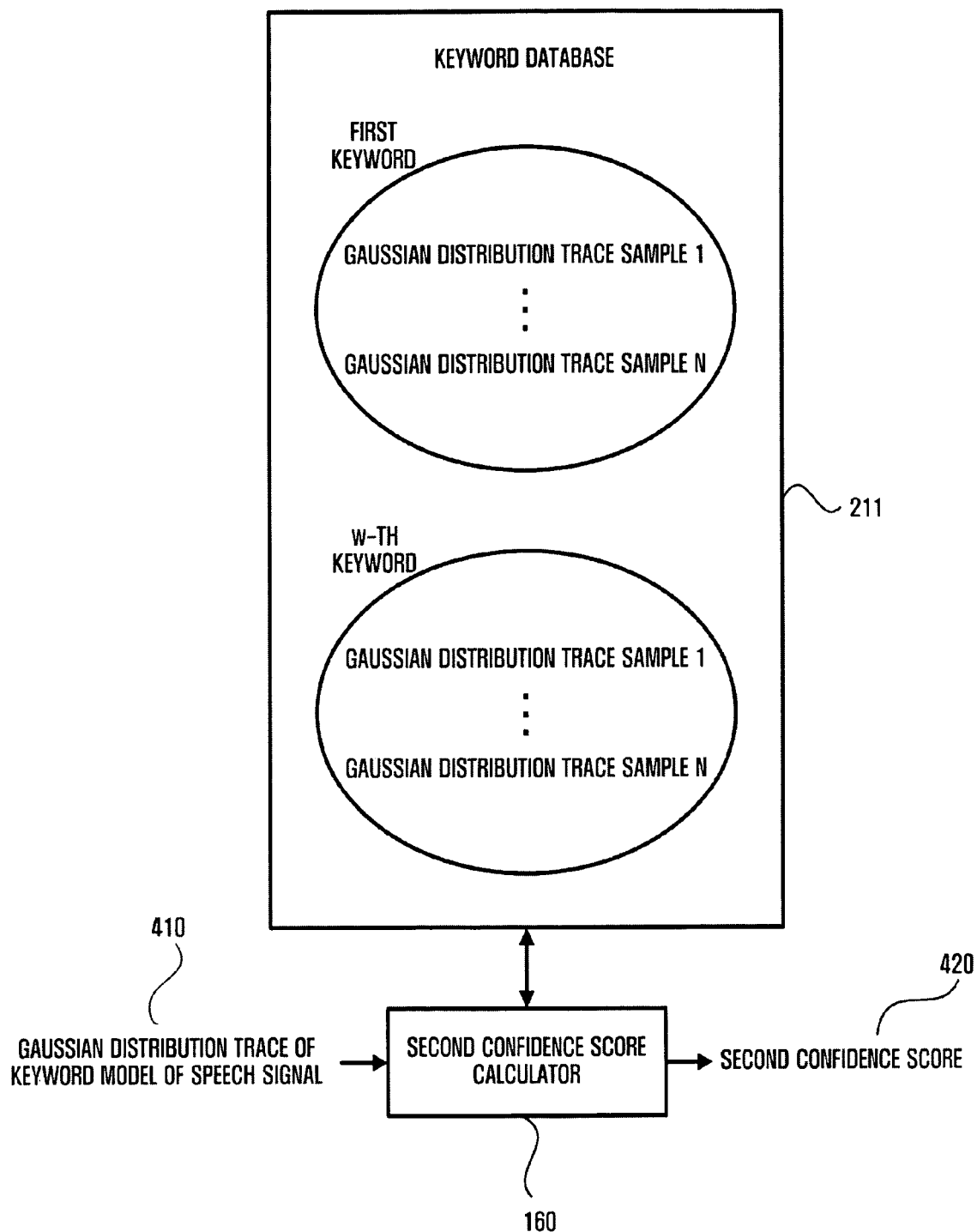
FIG. 4 is an exemplary view illustrating a step of calculating second confidence score for each word through a second confidence score calculator according to an embodiment of the present invention.

FIG. 4 is an exemplary view illustrating an operation of calculating the second confidence score for each word through the second confidence score calculator 160 according to an embodiment of the present invention.

The second confidence score calculator 160 calculates the second confidence score 420 by comparing the Gaussian distribution trace 410 of the keyword model per frame of the input speech signal with the Gaussian distribution trace sample of the stored corresponding keyword of the keyword model. In this case, the Gaussian distribution trace sample belongs to the keywords included in the keyword database 211 and can be stored by grouping per word.

Figure 5:
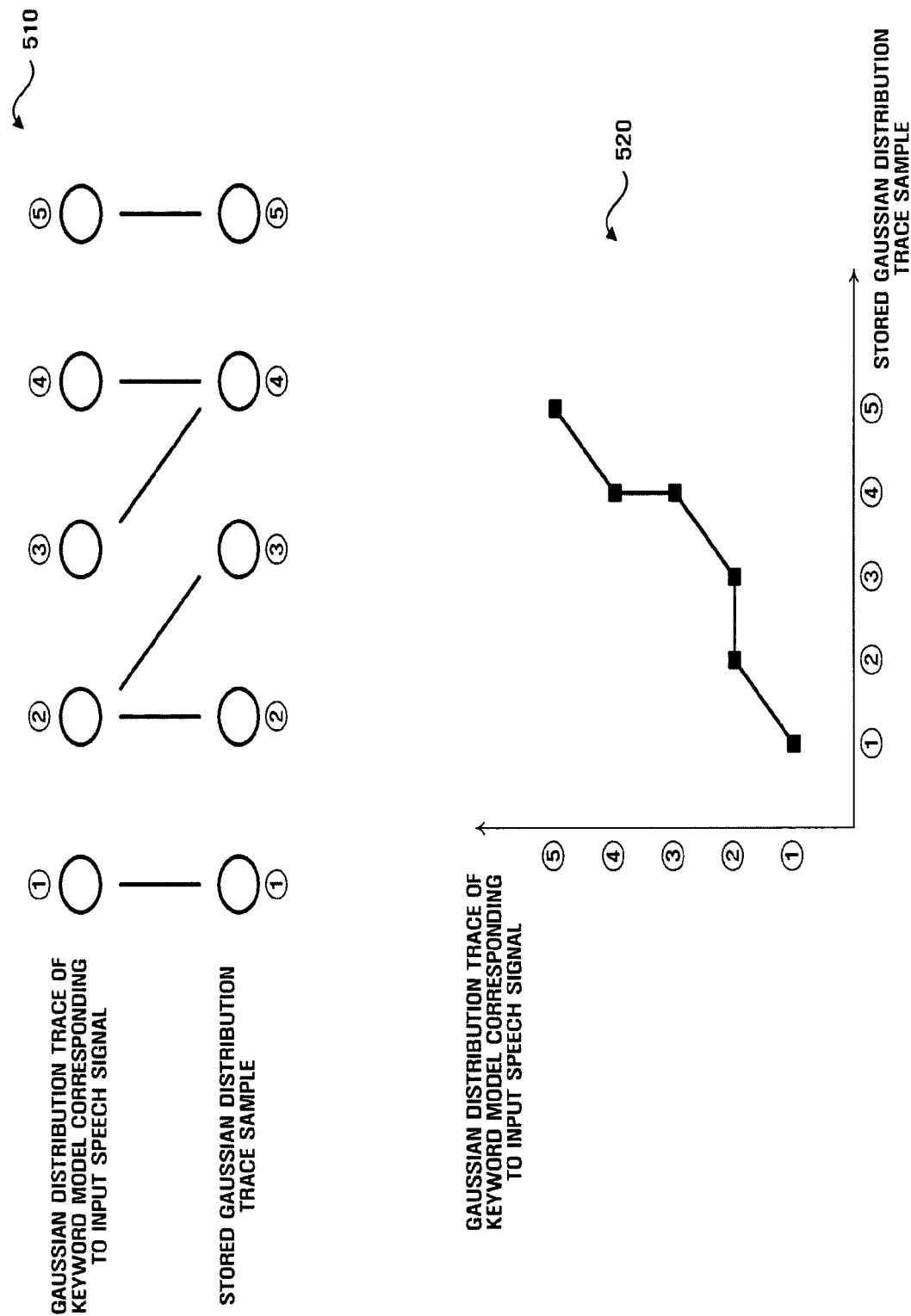
FIG. 5 is an exemplary view illustrating correlation between a Gaussian distribution trace for each frame of an input speech signal and a Gaussian distribution trace of a corresponding keyword according to an embodiment of the present invention.

FIG. 5 is an exemplary view illustrating correlation between the Gaussian distribution trace for each frame of the input speech signal and the Gaussian distribution trace sample of the corresponding keyword according to an embodiment of the present invention.

The correlation between the Gaussian distribution trace for each frame of the input speech signal and the Gaussian distribution trace sample of the corresponding keyword is determined by dynamic programming. A graph 520 corresponding to the determined correlation 510 can be generated.

Therefore, the second confidence score calculator 160 can calculate the second confidence score 420. In other words, the second confidence score 420 is calculated depending on the similarity of the trace per frame on the graph. For example, if similarity of the trace is high between corresponding frames, the second confidence score 420 of a high value is calculated. Conversely, if similarity of the trace is low between corresponding frames, the second confidence score 420 of a low value is calculated.

At this time, the second confidence score calculator 160 can give a weight value of the likelihood from the Filler model module 130 in accordance with the order of same Gaussian distributions when similarity of the corresponding Gaussian distribution trace is generated.

Figure 6:
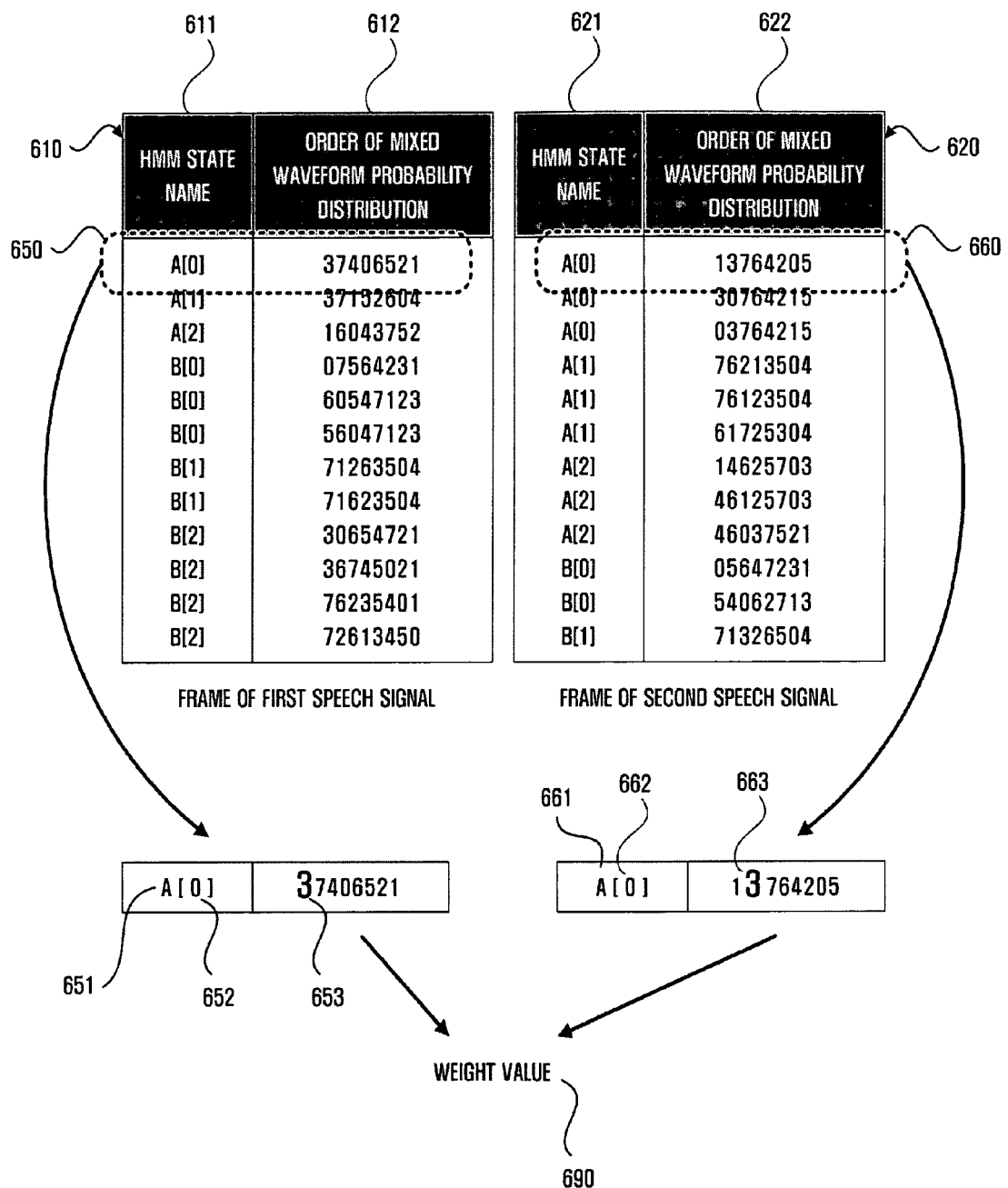
FIG. 6 is an exemplary view illustrating that a weight value is given in accordance with order of same Gaussian distributions when similarity of Gaussian distribution trace between frames is generated according to an embodiment of the present invention.

FIG. 6 is an exemplary view illustrating that the weight value is given in accordance with the order of the same Gaussian distributions when similarity of the Gaussian distribution trace between frames is generated according to an embodiment of the present invention.

Although the HMM state corresponding to the frame of the input speech signal is the same as the HMM state of the Gaussian distribution trace sample, the order of mixed waveform probability distributions constituting each HMM state may be different. Accordingly, the second confidence score calculator 160 compares the Gaussian distribution trace per frame of the input speech signal with the Gaussian distribution trace sample per word by using dynamic programming which is an algorithm that compares vectors having different lengths with each other.

HMM state names 611 and 621 include sub-words and a serial number. The serial number represents the order of the HMM state. In other words, one sub-word may include one or more HMM states. FIG. 6 shows a sub-word of three HMM states. In this case, a serial number of 0, 1, or 2 is given.

The orders 612 and 622 of the mixed waveform probability distributions correspond to the Gaussian distribution order of mixed waveforms. Each HMM state of FIG. 6 has the Gaussian distribution of eight waveforms.

The second confidence score calculator 160 gives a weight value 690 using the Gaussian distribution order of the mixed waveforms when comparing the Gaussian distribution trace of the keyword model per frame of the input speech signal with the Gaussian distribution trace sample of the stored corresponding keyword of the keyword model. In other words, the weight value 690 is given in accordance with the sub-words, the serial number and the order of the mixed waveform probability distributions.

For example, if the first frame 650 of the input speech signal frame 610 is compared with the first frame 660 of the stored keyword frame 620, the two frames 650 and 660 have the sub-words 651 and 661 equal to each other and the serial numbers 652 and 662 equal to each other. However, the two frames 650 and 660 have different arrangements, and the first waveform probability distribution 653 of the first frame 650 of the speech signal frame 610 is the same as the second waveform probability distribution 663 of the first frame 660 of the keyword frame 620. Accordingly, the weight value 690 is given.

Furthermore, if the two frames 650 and 660 have different sub-words or different serial numbers, the weight value 690 may be given. In this case, the size of the weight value 690 may be the greatest due to different sub-words, and may be the smallest in accordance with the order of the mixed waveform probability distributions.

The aforementioned comparison may be performed for all the keyword frames or between the frames having the same sub-word, or between the frames having the same sub-word and the same serial number.

Figure 7:
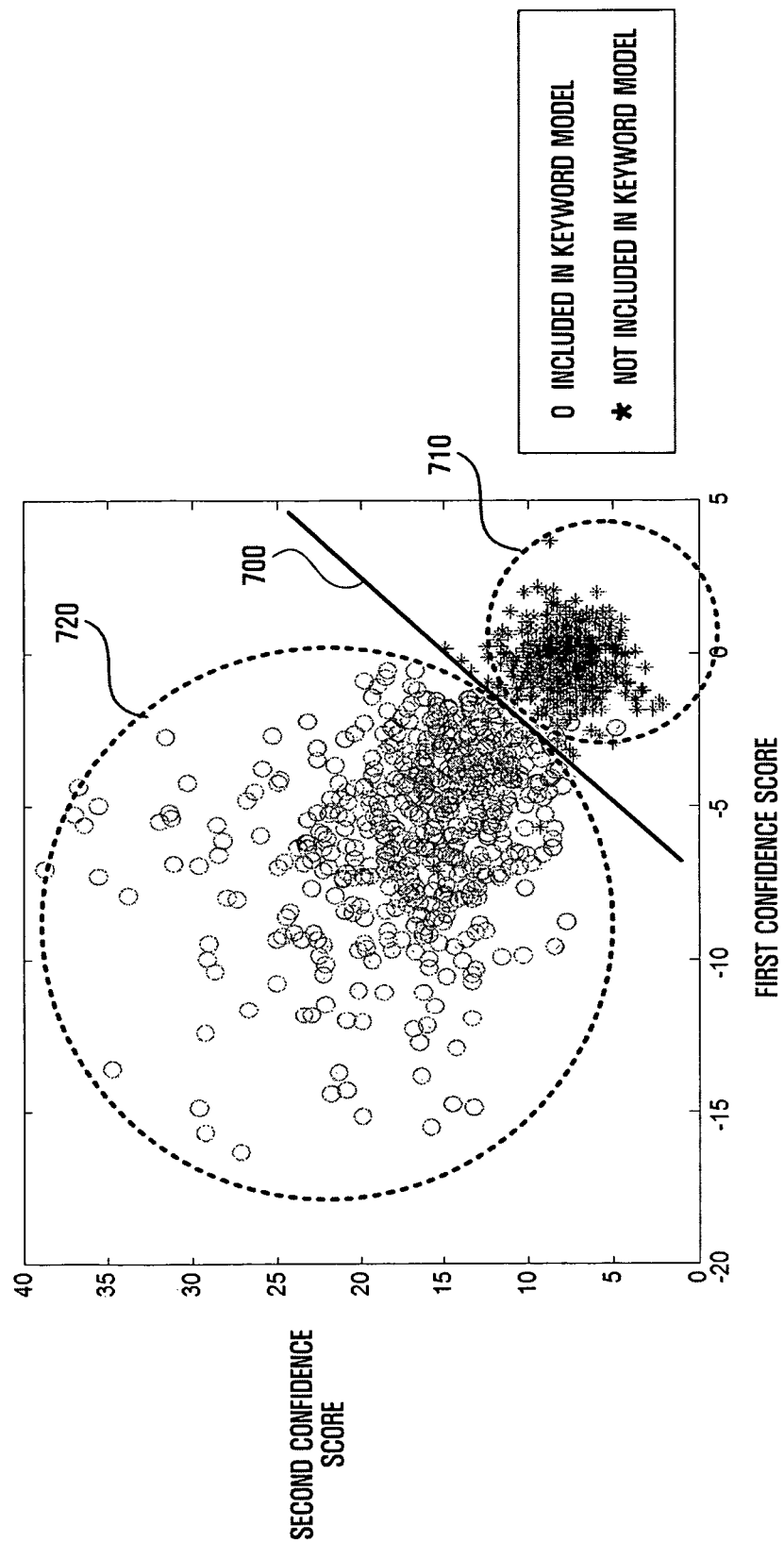
FIG. 7 is an exemplary view illustrating confidence coordinates according to an embodiment of the present invention.

FIG. 7 is an exemplary view illustrating the confidence coordinates according to an embodiment of the present invention. Referring to FIG. 7, the positions determined by the first and second confidence scores are marked by different symbols depending on confidence between the Gaussian distribution trace of the keyword model per frame of the input speech signal and the Gaussian distribution trace sample of the keyword stored to correspond to the keyword model.

In FIG. 7, a horizontal axis (the abscissa) is the first confidence score axis, and a vertical axis (the ordinate) is the second confidence score axis. The boundary 700 is generated by a reference function generator to properly divide symbol groups depending on similarity. The boundary may be controlled by the user.

Furthermore, although FIG. 7 illustrates the straight line boundary, it is to be understood that other boundaries are possible, including, for example, the curved boundary, the linear boundary or the non-linear boundary as described above. This boundary serves as a standard of judgment as to confidence between the Gaussian distribution trace of the keyword model per frame of the input speech signal and the Gaussian distribution trace sample of the stored corresponding keyword of the keyword model, and includes a keyword area 710 and a non-keyword area 720.

The reference function generator can update the position or the form of the boundary 700 depending on the input speech signal.

The results of an experiment performed by the method of the present embodiment follow. Speech signals of total 100 persons (50 men and 50 women) were recognized to construct speech recognition data, and a database of 20000 utterance words was constructed. The frame length was in the range of 30 ms to extract features, and the overlap length between frames was in the range of 20 ms. Also, MFCC was used to extract features. The coefficients of feature vectors actually used include 13 cepstrums of MFCC, 13 delta cepstrums (Δ cepstrums) thereof, and 13 delta delta cepstrums (Δ Δ cepstrums) thereof. In addition, LPC cepstrum, PLP cepstrum, or filter bank may be used.

A method for obtaining MFCC is as follows. The speech signal is filtered by an anti-aliasing filter and then converted into a digital signal x(n) through analog-to-digital (A/D) conversion. The digital speech signal is filtered by a digital pre-emphasis filter having high band-pass characteristics. Such high band-pass filtering is required for modeling of frequency characteristics of the external ear/middle ear of a human being. This high band-pass filtering compensates for attenuation to 20 dB/decade due to emission from a mouth, whereby only the vocal trace characteristics can be obtained from the speech. Also, this somewhat compensates for the fact that a hearing organ is susceptible to a spectral area of 1 kHz or greater. For the PLP feature extraction, an equal-loudness curve corresponding to frequency characteristics of a hearing organ is directly used for modeling. The characteristic H(z) of the pre-emphasis filter is as follows.

$$H(z)=1-az^{-1}$$

Here, "a" has a value in the range of 0.95~0.98.

The pre-emphasized signal is covered with a Hamming window and is divided into frames in the unit of a block. Later processing is performed in the unit of a frame. The frame has a size of 20 ms to 30 ms, and 10 ms is used for the movement of the frame. The speech signal of one frame is converted into a frequency domain using fast Fourier transform (FFT). In addition, discrete Fourier transform (DFT) may be used. The frequency band is divided into several filter banks, and energy of each bank is obtained. After a log is given to the band energy, discrete cosine transform (DCT) is performed to obtain final MFCC. A method for setting the form of the filter bank and the center frequency is determined in consideration of the hearing characteristics of the ear (i.e., frequency characteristics of a snail shell).

12 MFCC coefficients ($c_1$-$c_{12}$) are used, and frame log energy obtained separately from the MFCC coefficients is additionally used so that the feature vector used for the input of speech recognition becomes a thirteenth-order vector.

Linear Prediction Coefficients (LPC) are obtained by combination of previous speech samples, and are called prediction errors obtained to coincide the original speech samples with the speech samples obtained by combination.

A cepstrum takes a log scale after the feature vectors are extracted through LPC, FFT, and the like. The log scale allows equalized distribution so that coefficients having small difference have relatively great values and coefficients having great difference have relatively small values. As a result, cepstrum coefficients are obtained. Accordingly, LPC cepstrum method allows the coefficients to have equalized distribution through cepstrum after using LPC coefficients when features are extracted.

A method for obtaining PLP cepstrum is as follows. In PLP analysis, filtering is performed in a frequency area by using hearing characteristics of a human being and then the filtered result is converted into autocorrelation coefficients and then into cepstrum coefficients. In this case, hearing characteristics susceptible to temporal variation of the feature vectors can be used.

The filter bank is sometimes realized in a temporal area by using a linear filter. However, the filter bank is generally realized by applying a weight value to magnitude of coefficients corresponding to each band after the speech signal undergoes FFT.

The keyword model has 8 mixed waveform probability distributions, 3 to 5 five states, and 304 sub-words. Also, the keyword model has 46 monophones and 258 biphones. Meanwhile, the Filler model has 8 mixed waveform probability distributions, 3 to 5 five states, and 46 sub-words of monophone.

To test performance of the constructed speech recognition model, 20 persons (10 men and 10 women) were tested to utter instruction words, name and place name. At this time, 950 words were used in the keyword database 211, 467 words included in the keyword model and 496 words not included in the keyword model were used for reference function learning. Also, 478 words included in the keyword model and 537 words not included in the keyword model were used for test.

Equal error rate (EER) was used to estimate test performance. EER shows that a false alarm rate (FAR) in error recognized as the keyword area 710 in spite of the fact that the position according to the confidence score is included in the non-keyword area 720 on the confidence coordinates is the same as a false rejection rate (FRR) in error recognized as the non-keyword area 720 in spite of the fact that the position is included in the keyword area 710.

FIG. 8 is a graph illustrating an improved performance according to an embodiment of the present invention.

In experiments involving embodiments of the present invention, two sub-words are divided into a first group and a second group. Thus, the first experiment 810 sets the first group as the input speech signal and the second group as the keyword, and the second experiment 820 sets the first group as the stored keyword and the second group as the input speech signal.

When speech recognition is performed for the input speech signal according to the conventional art, EER, in which FAR is the same as FRR, is in the range of 5.29% 811 in the first experiment 810. However, if speech recognition is performed for the input speech signal according to the present invention, it is noted that EER is in the range of 2.39% 812 reduced by 54.8% in the first experiment. Likewise, it is noted that EER is in the range of 4.86% 821 in the second experiment 820 according to the prior art while EER is in the range of 2.45% 822 in the second experiment according to the present invention, which is reduced by 49.6%.

The apparatus and method for speech recognition according to the above-described embodiments of the present invention using a plurality of confidence score estimation have the following advantages.

First, the standard of judgment as to the confidence score of the speech recognition result is set using the plurality of confidence score estimation algorithms, and the input speech is recognized in accordance with the set standard of judgment. Therefore, it is possible to provide a high confidence score in comparison with one confidence score estimation algorithm.

Second, since the set standard of judgment is variably used, it is possible to allow the user to control confidence efficiency of speech recognition.

Reference will now be made in detail to embodiments of the present invention, examples of which are illustrated in the accompanying drawings, wherein like reference numerals refer to the like elements throughout. The embodiments are described below in order to explain the present invention by referring to the figures.

What is claimed is:

1. An apparatus, including at least one processing device, for speech recognition, the apparatus comprising:
   a first confidence score calculator calculating, using the at least one processing device, a first confidence score using a ratio between a likelihood of a keyword model for feature vectors per frame of a speech signal and a likelihood of a Filler model for the feature vectors;
   a second confidence score calculator calculating a second confidence score based on a determined similarity between a Gaussian distribution trace of the keyword model per frame of the speech signal and a Gaussian distribution trace sample of a stored corresponding keyword of the keyword model;
   a determination module determining a confidence of a result using the keyword model in accordance with a determination of whether a position determined by the first and second confidence scores is included in a keyword area or in a non-keyword area on a confidence coordinate system including an axis of the first confidence score calculated by the first confidence score calculator using the at least one processing device and another axis of the second confidence score calculated by the second confidence score calculator based on the determined similarity,
   wherein the second confidence score calculator calculates the second confidence score using a weight value which given in accordance with a sub-word, a serial number, and an order of the mixed waveform probability distributions, and assigned in accordance with an arrangement order of the Gaussian distribution trace and the Gaussian distribution trace sample; and
   a controller identifying whether the first and second confidence scores are to be used to generate a reference function or to be used to recognize the speech signal,
   wherein the first and second confidence scores are transmitted to the determination module when the controller identifies that the first and second confidence scores are to be used to recognize the speech signal, and
   wherein at least one of a position and form of the generated reference function is updated based on the speech signal.

2. The apparatus of claim 1, wherein the frame includes at least one hidden Markov model state.

3. The apparatus of claim 1, further comprising a feature vector extractor extracting the feature vectors.

4. The apparatus of claim 3, wherein the feature vector extractor extracts the feature vectors using at least one of linear predictive coding (LPC), an LPC derived cepstrum, perceptive linear prediction (PLP), audio model feature extraction, mel-frequency cepstrum coefficients (MFCC) extraction, and a filter bank.

5. The apparatus of claim 1, wherein the keyword model is extracted using a Viterbi decoder.

6. The apparatus of claim 1, wherein the second confidence score calculator calculates the second confidence score using dynamic programming.

7. The apparatus of claim 1, further comprising a reference function generator generating the reference function, which is a boundary serving as a standard of judgment as to the confidence score in accordance with the position,
   wherein the controller transmits the first and second confidence scores to the reference function generator when the controller identifies the first and second confidence scores are to be used to generate the reference function.

8. A speech recognition method, the method comprising:
   calculating, using at least one processing device, a first confidence score using a ratio between a likelihood of a keyword model for feature vectors per frame of a speech signal and a likelihood of a Filler model for the feature vectors;
   calculating a second confidence score based on a determined similarity between a Gaussian distribution trace of the keyword model per frame of the speech signal and a Gaussian distribution trace sample of a stored corresponding keyword of the keyword model;
   determining a confidence of a result calculated using the keyword model in accordance with a determination of whether a position determined by the first and second confidence scores is included in a keyword area or in a non-keyword area on a confidence coordinate system including an axis of the first confidence score calculated using the likelihood ratio of the first likelihood and the second likelihood and another axis of the second confidence score calculated based on the determined similarity,
   wherein the calculating the second confidence score comprises assigning a weight value which given in accordance with sub-word, a serial number, and an order of the mixed waveform probability distributions, and in accordance with an arrangement order of the Gaussian distribution trace and the Gaussian distribution trace sample; and
   identifying whether the first and second confidence scores are to be used to generate a reference function or to be used to recognize the speech signal, and
   wherein at least one of a position and form of the generated reference function is updated based on the speech signal.

9. The method of claim 8, wherein the frame includes at least one hidden Markov model state.

10. The method of claim 8, further comprising extracting the feature vectors.

11. The method of claim 10, wherein the extracting of the feature vectors comprises extracting the feature vectors by using at least one of linear predictive encoding (LPC), an LPC derived cepstrum, perceptive linear prediction (PLP), audio model feature extraction, mel-frequency cepstrum coefficients (MFCC) extraction, and a filter bank.

12. The method of claim 10, wherein the calculating the second confidence score is calculated using dynamic programming.

13. The method of claim 8, wherein the keyword model is extracted using a Viterbi decoder.

14. The method of claim 8, further comprising generating the reference function, which is a boundary serving as a standard of judgment as to the confidence score in accordance with the position on the confidence coordinates, when the first and second confidence scores are identified to be used for generating the reference function.

15. A speech recognition method, comprising:
determining, using at least one processing device, a first likelihood using a keyword model that extracted features of an input speech signal match a stored keyword of a keyword model;
determining a second likelihood using a filler model that the extracted features of the input speech are noise or do not match the stored keyword;
calculating a first confidence score based on a likelihood ratio of the first likelihood and the second likelihood;
calculating a second confidence score based on a determined similarity between a Gaussian distribution trace of the keyword model of the input speech signal and a Gaussian distribution trace sample of a stored corresponding keyword;
identifying whether the first and second confidence scores are to be used to generate a reference function or to be used to recognize the speech signal; and
setting a standard of judgment as to confidence of the result of speech recognition on a coordinate system defined by axes respectively corresponding to the first confidence score and the second confidence score using the generated reference function, and determining whether the input speech signal corresponds to a word in a keyword database based on a position determined by the first and second confidence scores on the coordinate system including an axis of the first confidence score calculated using the likelihood ratio of the first likelihood and the second likelihood and another axis of the second confidence score calculated based on the determined similarity,
wherein the calculating the second confidence score comprises assigning a weight value which given in accordance with a sub-word, a serial number, and an order of the mixed waveform probability distributions, and in accordance with an arrangement order of the Gaussian distribution trace and the Gaussian distribution trace sample,
wherein at least one of a position and form of the generated reference function is updated based on the input speech signal.

16. The method of claim 15, wherein the coordinate system is a two dimensional Cartesian coordinate system.

17. A computer-readable non-transitory storage medium encoded with processing instructions to control a processor to execute a speech recognition method, the method comprising:
calculating a first confidence score using a ratio between a likelihood of a keyword model for feature vectors per frame of a speech signal and a likelihood of a Filler model for the feature vectors;
calculating a second confidence score based on a determined similarity between a Gaussian distribution trace of the keyword model per frame of the speech signal and a Gaussian distribution trace sample of a stored corresponding keyword of the keyword model;
determining a confidence of a result calculated using the keyword model in accordance with a determination of whether a position determined by the first and second confidence scores is included in a keyword area or in a non-keyword area on a confidence coordinate system, including an axis of the first confidence score calculated using the likelihood ratio of the first likelihood and the second likelihood and another axis of the second confidence score calculated based on the determined similarity,
wherein the calculating the second confidence score comprises assigning a weight value which given in accordance with a sub word, a serial number, and an order of the mixed waveform probability distributions in accordance with an arrangement order of the Gaussian distribution trace and the Gaussian distribution trace sample; and
identifying whether the first and second confidence scores are to be used to generate a reference function or to be used to recognize the speech signal,
wherein at least one of a position and form of the generated reference function is updated based on the speech signal.

18. A computer-readable non-transitory storage medium encoded with processing instructions to control a processor to execute a speech recognition method, the method comprising:
determining a first likelihood using a keyword model that extracted features of an input speech signal match a stored keyword of a keyword model;
determining a second likelihood using a filler model that the extracted features of the input speech are noise or do not match the stored keyword;
calculating a first confidence score based on a likelihood ratio of the first likelihood and the second likelihood;
calculating a second confidence score based on a determined similarity between a Gaussian distribution trace of the keyword model of the input speech signal and a Gaussian distribution trace sample of a stored corresponding keyword;
identifying whether the first and second confidence scores are to be used to generate a reference function or to be used to recognize the speech signal; and
setting a standard of judgment as to confidence of the result of speech recognition on a coordinate system defined by axes respectively corresponding to the first confidence score and the second confidence score using the generated reference function, and determining whether the input speech signal corresponds to a word in a keyword database based on a position determined by the first and second confidence scores on the coordinate system including an axis of the first confidence score calculated using the likelihood ratio of the first likelihood and the second likelihood and another axis of the second confidence score calculated based on the determined similarity,
wherein the calculating the second confidence score comprises assigning a weight value which given in accordance with a sub-word, a serial number, and an order of the mixed waveform probability distributions, and in accordance with an arrangement order of the Gaussian distribution trace and the Gaussian distribution trace sample, and wherein at least one of a position and form of the generated reference function is updated based on the speech signal.

* * * * *